E. W. MILLER.
SPRING WHEEL.
APPLICATION FILED SEPT. 24, 1915.

1,179,023.

Patented Apr. 11, 1916.
2 SHEETS—SHEET 1.

Witnesses
Philip H. Burch

Inventor
Ellsworth W. Miller
By Victor J. Evans
Attorney

E. W. MILLER.
SPRING WHEEL.
APPLICATION FILED SEPT. 24, 1915.
1,179,023.
Patented Apr. 11, 1916.
2 SHEETS—SHEET 2.
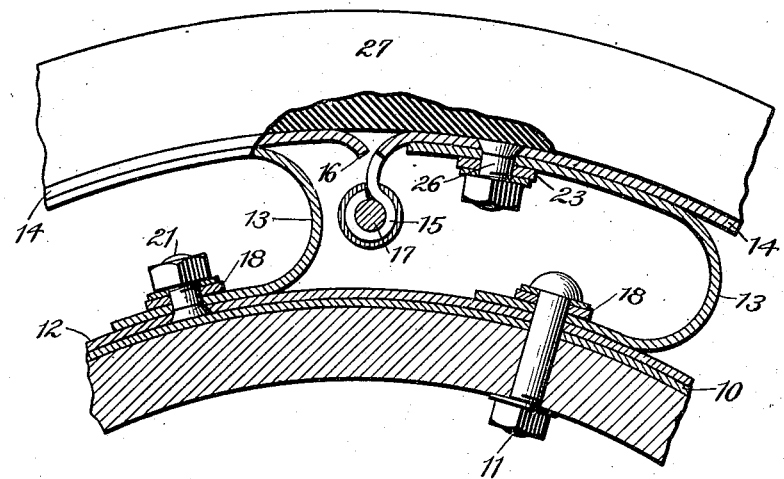
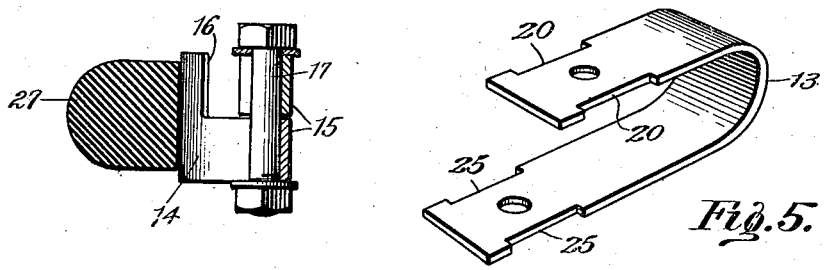
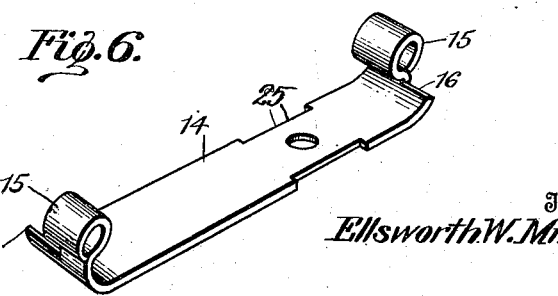
Witnesses
Philip H. Burch
Inventor
Ellsworth W. Miller
By Victor J. Evans
Attorney

UNITED STATES PATENT OFFICE.

ELLSWORTH W. MILLER, OF HAZLETON, PENNSYLVANIA.

SPRING-WHEEL.

1,179,023.

Specification of Letters Patent.

Patented Apr. 11, 1916.

Application filed September 24, 1915. Serial No. 52,478.

*To all whom it may concern:*

Be it known that I, ELLSWORTH W. MILLER, a citizen of the United States, residing at Hazleton, in the county of Luzerne and State of Pennsylvania, have invented new and useful Improvements in Spring-Wheels, of which the following is a specification.

The invention relates to wheels, and more particularly to the class of spring or resilient automobile wheels or the like.

The primary object of the invention is the provision of a wheel of this character wherein an ordinary solid rubber tire can be used and maximum resiliency will be had so that the wheel will absorb all shocks and jars incident to the travel of the wheel, and at the same time obviating punctures, blowouts, or the like.

Another object of the invention is the provision of a wheel of this character wherein the tire is resiliently supported so as to relieve the wheel from undue strain, shocks and jars during the travel thereof, and thus increasing the life of the wheel.

A further object of the invention is the provision of a wheel of this character wherein the construction thereof is novel in form to render it resilient and to permit the mounting of a cushion or solid tire thereon.

A still further object of the invention is the provision of a wheel of this character which is simple in construction, reliable and efficient in operation, strong, durable, and inexpensive in manufacture.

With these and other objects in view, the invention consists in the construction, combination and arrangement of parts as will be hereinafter fully described, illustrated in the accompanying drawings, and pointed out in the claim hereunto appended.

Figure 1:
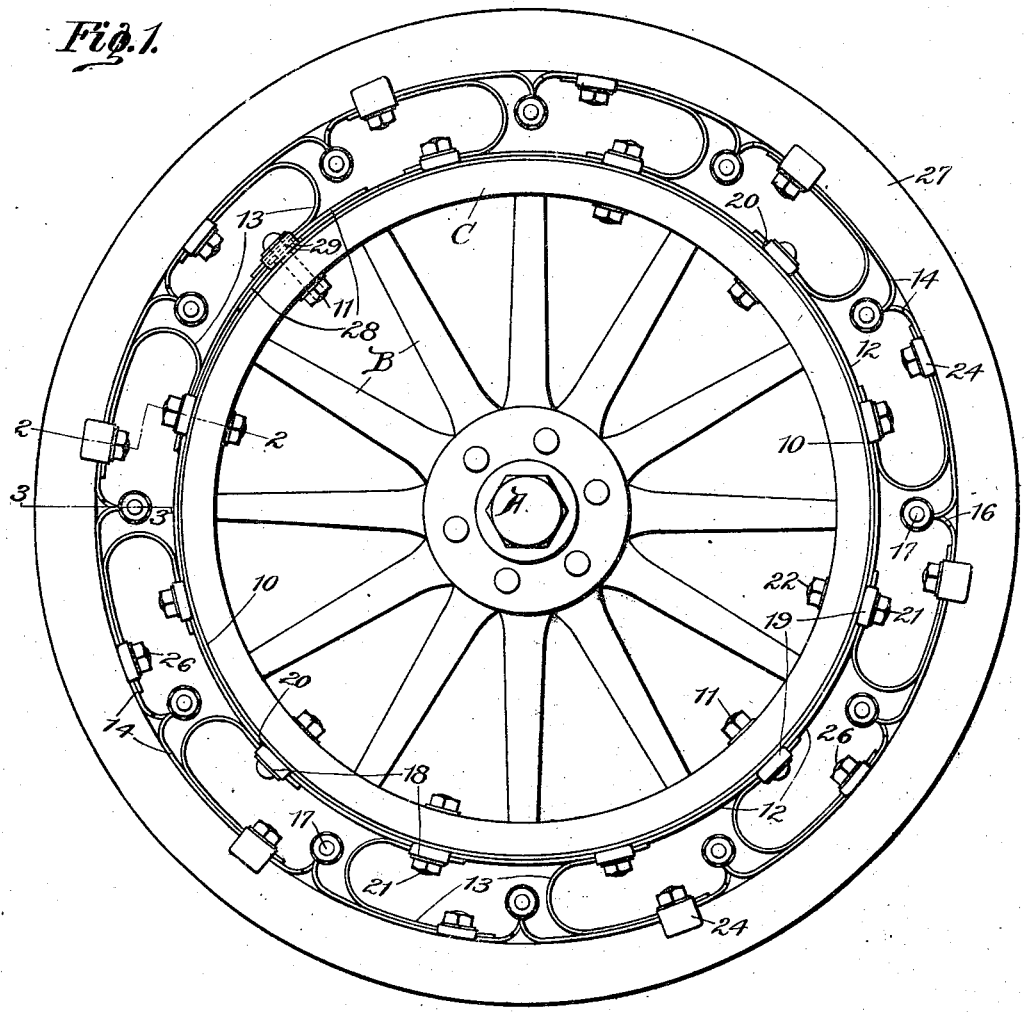
Figure 2:
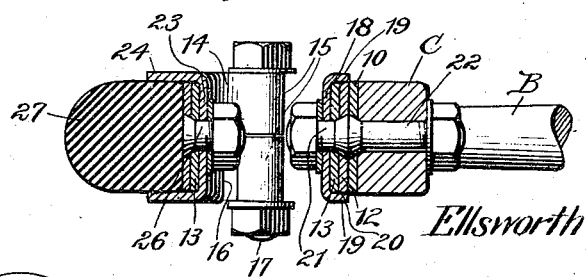

In the drawings:—Figure 1 is a side elevation of a wheel constructed in accordance with the invention. Fig. 2 is a sectional view on the line 2—2 of Fig. 1. Fig. 3 is a sectional view on the line 3—3 of Fig. 1. Fig. 4 is a fragmentary vertical longitudinal sectional view through the wheel. Fig. 5 is a perspective view of one of the springs. Fig. 6 is a perspective view of one of the sections of the flexible annulus.

Similar reference characters indicate corresponding parts throughout the several views in the drawings.

Referring to the drawings in detail, A designates a hub, B the spokes, and C the felly, which constitute the body of the wheel proper, preferably made from hard wood, and is of the ordinary well-known construction.

Surrounding the felly C concentrically thereof is an inner annulus 10, which is secured in place through the medium of bolt members 11 passed therethrough and also through the felly C, while concentrically disposed about the annulus 10 and supported thereon is an outer annulus or hoop 12 which has arranged at intervals about the same semi-oval or elliptical shaped leaf springs 13 supporting a flexible annulus comprising a plurality of sections 14 which at opposite ends are inwardly bent and formed with pintle sleeves 15, the inwardly bent ends of the sections 14 being cut away at 16 so that the sleeves 15 at the adjacent ends of the said sections will aline with each other and have passed therethrough pivot bolts 17 flexibly connecting the sections 14 together.

The inner ends of the springs 13 have straddling the same clips 18 which are transversely disposed and are formed with right angular ears 19 which engage in registering notches 20 formed in the outer annulus or hoop 12 and the said ends of the springs 13 so as to prevent longitudinal displacement of the springs upon the outer annulus or hoop 12. Certain of the clips 18 are fastened upon the annulus 12 through the medium of bolt members 21 which are passed through the clips 18, spring 13 and annulus or hoop 12, the remaining clips being fastened through the medium of bolt members 11 which are passed therethrough and through the springs 13, annulus or hoop 12 and the felly C of the wheel body, while passed through the inner annulus and the felly C are the bolt members 22 which secure the said annulus thereon. Straddling the other ends of the springs 13 are clips 23 which are formed with right angular ears 24 engaged in registering notches 25 formed in the sides of the springs 13 and the sections 14 of the flexible annulus, respectively, the said clips 23 being fastened in position through the medium of bolt members 26 which are passed therethrough and also through the springs 13 and sections 14 for uniting the same. The ears 24 on alternate clips 23 are of greater length than the ears on the remainder of said clips 23 so as to fasten a cushion or solid rubber tire 27 upon the flexible annulus at the outer side thereof.

The annulus or hoop 12 is split and has its ends 28 disposed in overlapping relation, these ends being provided with registering elongated slots 29 which permit the tightening of the annulus 12 upon the felly C, as will be clearly apparent. The longer ears 24 of the clips 23 will prevent the lateral slipping of the tire from the flexible annulus.

It will be apparent that when undue shocks and jars are imparted to the wheel the flexible annulus will respond thereto and the said shocks and jars will be absorbed by the springs 13, and thereby relieving the strain upon the wheel and at the same time maximum resiliency will be had, yet the possibility of punctures and blow-outs will be obviated and the employment of a pneumatic tire eliminated.

From the foregoing description, taken in connection with the accompanying drawings, the construction and manner of operation of the device will be clearly understood, and therefore a more extended explanation has been omitted.

What is claimed is:—

A spring wheel comprising a wheel body proper having a felly, inner and outer annuli concentrically arranged about the felly, fasteners securing the inner annulus to the felly, a sectional hinge-jointed flexible annulus concentrically disposed with respect to the outer annulus, fasteners for securing the outer annulus upon the inner annulus and felly, resilient means interposed between the flexible and outer annuli between the hinged points of said flexible annulus, each resilient means being formed with straight extremities provided with opposite notches, a cushion tire supported upon the flexible annulus, U-shaped clips straddling the straight extremities of each resilient means and engaged in the opposite notches therein to abut opposite sides of the inner and outer annuli and the cushion tire, certain of said fasteners being engaged in the innermost straight extremities and the innermost clips, and fasteners passed through the outermost straight extremities and the outermost clips.

In testimony whereof I affix my signature in presence of two witnesses.

ELLSWORTH W. MILLER.

Witnesses:
JOHN M. NEFF,
LEAR C. BECK.

Copies of this patent may be obtained for five cents each, by addressing the "Commissioner of Patents, Washington, D. C."